(12) United States Patent
Robert et al.

(10) Patent No.: US 10,964,047 B2
(45) Date of Patent: Mar. 30, 2021

(54) DEVICE FOR LOCATING A TARGET BY STELLAR CORRECTION, INTENDED TO BE ON BOARD A MOBILE CARRIER

(71) Applicant: SAFRAN ELECTRONICS & DEFENSE, Boulogne-Billancourt (FR)

(72) Inventors: Emmanuel Robert, Boulogne-Billancourt (FR); Flavien Roland, Boulogne-Billancourt (FR); Arnaud Davenel, Boulogne-Billancourt (FR); Benjamin Deleaux, Boulogne-Billancourt (FR); David Roberfroid, Boulogne-Billancourt (FR); Georges-Olivier Reymond, Boulogne-Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 0 days.

(21) Appl. No.: 16/469,134

(22) PCT Filed: Dec. 12, 2017

(86) PCT No.: PCT/EP2017/082409
§ 371 (c)(1),
(2) Date: Jun. 12, 2019

(87) PCT Pub. No.: WO2018/108897
PCT Pub. Date: Jun. 21, 2018

(65) Prior Publication Data
US 2019/0385333 A1 Dec. 19, 2019

(30) Foreign Application Priority Data

Dec. 16, 2016 (FR) ...................... 1662631

(51) Int. Cl.
*G06T 7/70* (2017.01)
*H04N 5/232* (2006.01)
(Continued)

(52) U.S. Cl.
CPC .............. *G06T 7/70* (2017.01); *B64C 39/024* (2013.01); *B64D 47/08* (2013.01); *G01S 3/7867* (2013.01);
(Continued)

(58) Field of Classification Search
CPC .......... G06T 7/70; G01S 3/786; H04N 5/232; B64C 39/02; B64D 47/08
See application file for complete search history.

(56) References Cited

U.S. PATENT DOCUMENTS

2010/0208244 A1   8/2010   Earhart et al.
2014/0340515 A1*  11/2014  Tanaka ..................... G06T 5/50
                                                        348/143
(Continued)

FOREIGN PATENT DOCUMENTS

EP   1440329 A1   7/2004
EP   2208083 A1   7/2010
(Continued)

OTHER PUBLICATIONS

International Search Report and Written Opinion received for PCT Patent Application No. PCT/EP2017/082409, dated Mar. 1, 2018, 19 pages (9 pages of English Translation and 10 pages of Original Document).

*Primary Examiner* — Dave Czekaj
*Assistant Examiner* — Berteau Joisil
(74) *Attorney, Agent, or Firm* — Womble Bond Dickinson (US) LLP

(57) ABSTRACT

The invention concerns a device (1) for locating a target, comprising: —a camera (2) that can be oriented in an
(Continued)

orientation in view of the target so that the camera acquires an image of the target, and an orientation in view of a star so that the camera acquires at least one image of the star, —an inertial unit (4) configured to calculate position and orientation data of the camera (2), —a resetting module (6) configured to a apply stellar resetting to the data on the basis of the image of the star, in order to produce reset data, —a location module (8) configured to estimate a position of the target (T) from the image of the target (T) and the reset data, —a communication interface for communicating with an operator station, the camera (2) passing from one orientation to the other in response to the reception, by the interface, of a command sent by the operator station.

16 Claims, 2 Drawing Sheets

(51) Int. Cl.
*B64C 39/02* (2006.01)
*B64D 47/08* (2006.01)
*G01S 3/786* (2006.01)
*G01P 15/00* (2006.01)

(52) U.S. Cl.
CPC ..... *H04N 5/23203* (2013.01); *H04N 5/23299* (2018.08); *B64C 2201/024* (2013.01); *B64C 2201/123* (2013.01); *G01P 15/00* (2013.01); *G06T 2207/10032* (2013.01); *G06T 2207/10048* (2013.01)

(56) References Cited

U.S. PATENT DOCUMENTS

2016/0033272 A1* 2/2016 Struckhoff ............. G01S 17/08
                                                                   356/4.01
2016/0097857 A1    4/2016 Gokay et al.

FOREIGN PATENT DOCUMENTS

| EP | 3073223 A1 | 9/2016 | |
|---|---|---|---|
| WO | 03/36323 A1 | 5/2003 | |
| WO | 2007/028826 A1 | 3/2007 | |
| WO | 2009/054010 A1 | 4/2009 | |
| WO | WO-2009054010 A1 * | 4/2009 | ............... G01S 5/16 |

* cited by examiner

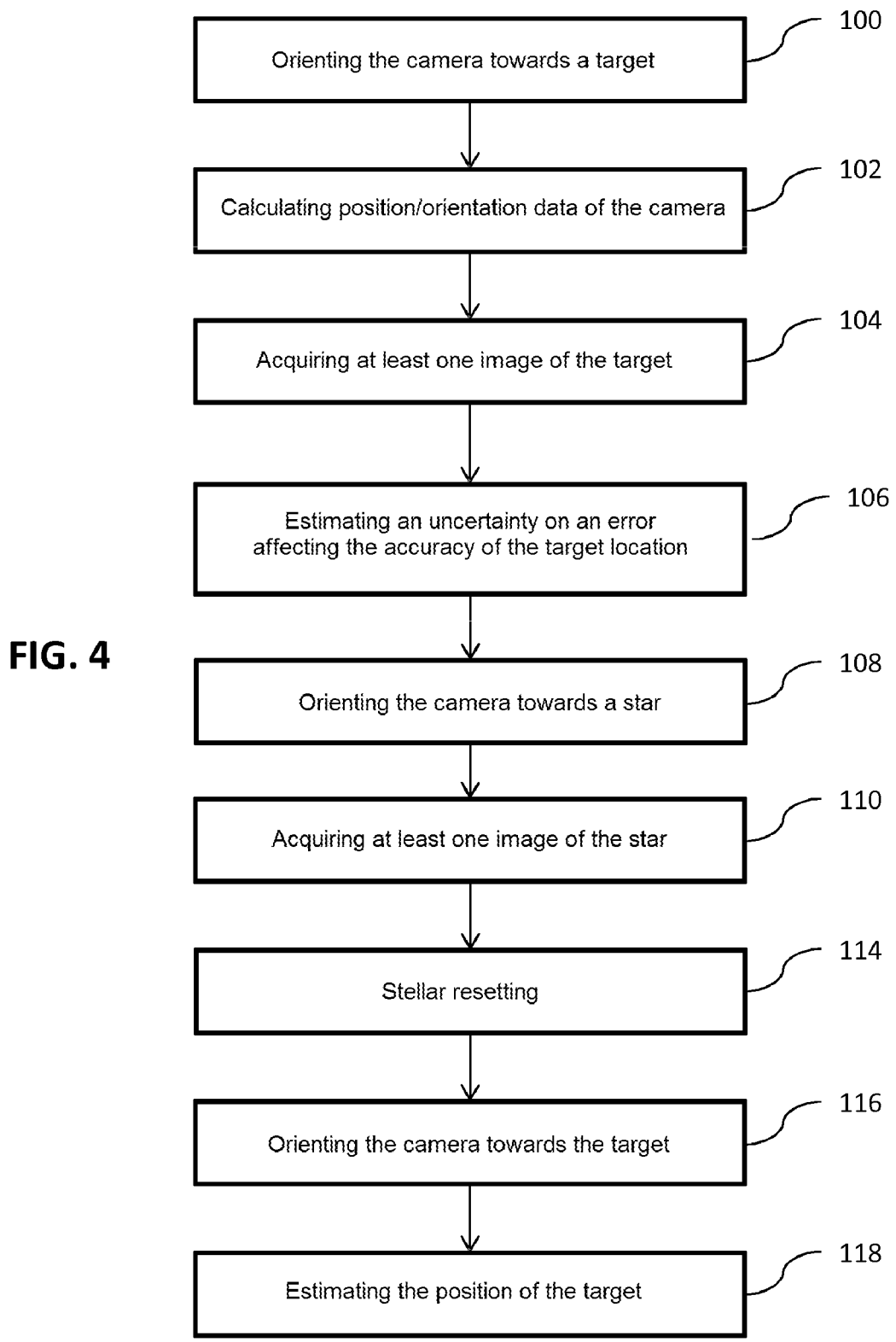

DEVICE FOR LOCATING A TARGET BY STELLAR CORRECTION, INTENDED TO BE ON BOARD A MOBILE CARRIER

FIELD OF THE INVENTION

The present invention relates to a device locating a target intended to be on board a carrier and implementing a stellar correction.

STATE OF THE ART

There is known from the state of the art a device for locating a target intended to be on board an aircraft, the device comprising:
- a mobile camera configured to be oriented towards a target,
- an inertial unit configured to calculate position and/or orientation data of the camera,
- a location module configured to estimate a position of the target from the data provided by the inertial unit.

The device is generally mounted on a wall of the aircraft, so as to allow the location of ground targets when the aircraft is in flight.

However, the data provided by the inertial unit may be tainted with drifts, with the result that the position estimated by the location module may be very far from the actual position of the target.

To correct such drifts, it is known to have a stellar viewfinder on board the aircraft. The stellar viewfinder is mounted on an upper wall of the aircraft, so as to be facing the sky.

The stellar viewfinder comprises a camera that acquires images of at least one star whose position is predetermined, and a module configured to apply to the data provided by the inertial unit a processing referred to in the literature as "stellar correction" or "stellar sight correction". The images acquired by the camera of the stellar viewfinder allow revealing a deviation between the supposed position of the star and its actual position. By virtue of the stellar correction, this deviation is used to correct drift errors affecting the data calculated by the inertial unit. This correction is effective due to the fact that the star is a reliable reference point.

However, a carrier is subject to mechanical deformations with the result that the relative position of the camera used to observe the target relative to the stellar viewfinder may vary unpredictably, and thus affect the efficiency of the stellar correction.

Moreover, the stellar viewfinder is a relatively bulky device that weighs down the carrier, which is particularly detrimental when the carrier is a light aircraft of the drone type.

Thus, it has been proposed in document EP 1 440 329 B1 a method for locating a target using a mobile camera.

DISCLOSURE OF THE INVENTION

An object of the invention is to improve the location performances of a location device intended to be on board a carrier, without weighing down the carrier.

It is therefore proposed, according to a first aspect, a device for locating a target intended to be on board a mobile carrier, the device comprising:
- a camera orientable relative to the carrier in:
  - a first orientation towards the target so that the camera acquires an image of the target, and
  - a second orientation towards at least one predetermined star so that the camera acquires at least one image of the star,
- an inertial unit configured to calculate position and orientation data of the camera,
- a stellar correction module configured to apply a stellar correction to the data calculated by the inertial unit based on the image of the star, so as to produce corrected position and orientation data,
- a location module configured to estimate a position of the target from the image of the target and the corrected data,
- an interface of communication with an operator station, the camera further being configured to switch from one of the first and second orientations to the other of the first and second orientations in response to the reception, by the communication interface, of a command issued by the operator station.

In the proposed device, the same camera is used to observe the target to locate and acquire the image(s) showing at least one predetermined star which is used for the implementation of the stellar correction. As the use of an additional camera is saved, the total bulk of the location device is reduced.

In addition, the location performances of the device are not interfered with mechanical deformations of the carrier.

The method according to the first aspect can be completed with the help of the following characteristics, taken alone or in combination when technically possible.

The location device may comprise an uncertainty estimation module configured to estimate an uncertainty on an error affecting the accuracy of the position estimated by the location module, and the camera can be configured to switch from the first orientation to the second orientation when the uncertainty crosses a first predetermined threshold.

The uncertainty may be an uncertainty on a position error tainting the position of the target estimated by the location module.

The uncertainty can alternatively be an uncertainty on a heading error of the camera tainting a heading data calculated by the inertial unit.

The first threshold may be less than or equal to 0.3 milliradians.

The camera can be configured to switch from the second orientation to the first orientation when the second uncertainty crosses a second predetermined threshold.

The second threshold may be less than or equal to the first threshold.

The camera can be configured to acquire the image of the predetermined star in an infrared acquisition mode in which the camera is sensitive to infrared wavelengths.

It is further proposed, according to a second aspect, an aircraft, such as a drone, comprising a device for locating a target according to the first aspect.

It is further proposed, according to a third aspect, a method for locating a target, comprising steps of:
- orienting a mobile camera on board a mobile carrier in a first orientation in which the target is within sight of the camera,
- calculating, by an inertial unit, position and orientation data of the camera,
- acquiring, by the camera, at least one image of the target,
- orienting the camera in a second orientation relative to the carrier in which a predetermined star is within sight of the camera,
- acquiring at least one image of the star by the camera, applying a stellar correction to the data calculated by the inertial unit based on the image of the star, so as to produce corrected position and orientation data, estimating a position of the target from the image of the target and the corrected data, wherein the camera switches from one of the first and second orientations to the other in response to the reception of a command issued from an operator station.

DESCRIPTION OF THE FIGURES

Other characteristics, objects and advantages of the invention will become apparent from the following description, which is purely illustrative and non-limiting, and which should be read with reference to the appended drawings in which:

FIG. 4 is a flowchart of steps of a method for locating a target according to one embodiment.

In all the figures, similar elements bear identical references.

DETAILED DESCRIPTION OF THE INVENTION

Target Location Device

Figure 1:
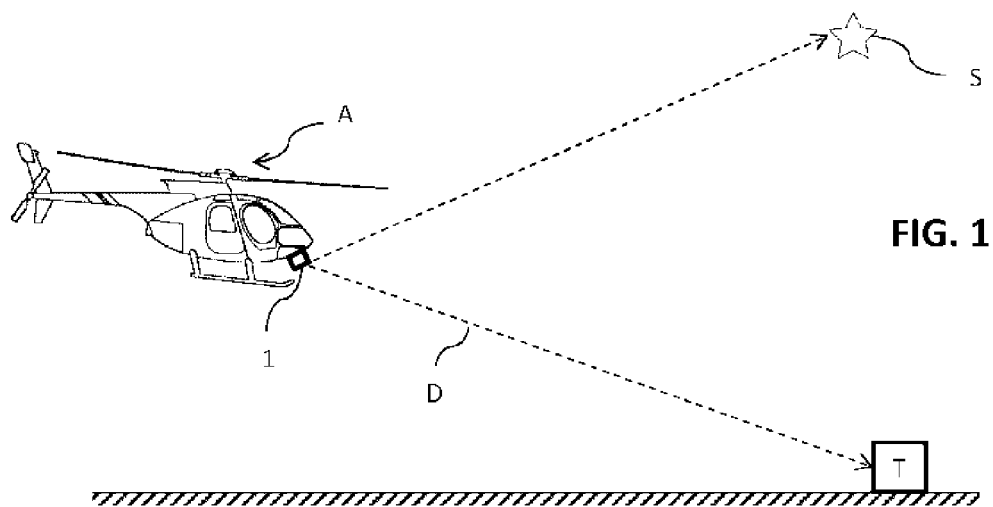
FIG. 1 is a view, in a vertical plane relative to the ground, of a target, a carrier having on board a device for locating the target, and a star.

With reference to FIG. 1, a mobile carrier such as an aircraft A comprises a device for locating a target T. A star S is also represented in FIG. 1.

The aircraft A is a drone, a helicopter, a plane, etc. In FIG. 1, the aircraft is a helicopter.

Figure 2:
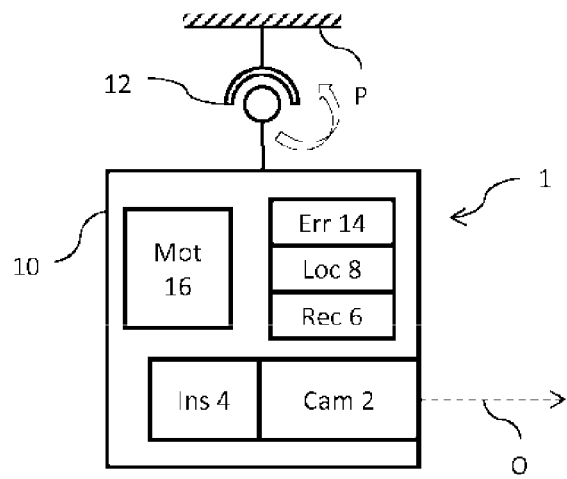
FIG. 2 is a schematic view showing the inner components of the location device, according to one embodiment.

With reference to FIG. 2, the location device 1 comprises a camera 2, an inertial unit 4, a stellar correction module 6 and a target location module 8.

The location device 1 is mounted to a lower wall P of the aircraft A, that is to say a wall intended to be facing the ground when the aircraft A is flying.

Alternatively, the location device 1 can be mounted on another wall of the aircraft A, for example an upper wall of the aircraft A, that is to say a wall intended to be facing the sky when the aircraft A is flying.

The location device 1 further comprises a casing 10 rotatably mounted on the wall of the aircraft A, via for example a ball joint connection 12.

The camera 2, the inertial unit 4, the correction module 6 and the location module 8 are housed in the casing 10 and for example fixed relative thereto.

In particular, the inertial unit 4 is preferably secured to the camera 2.

The camera 2 is movable between several orientations relative to the carrier A.

The camera 2 is on the one hand able to be oriented towards the ground.

The camera 2 is on the other hand able to be oriented towards the sky. Preferably, the camera 2 is able to take an orientation in which the optical axis of the camera 2 has a maximum elevation of 30 degrees (i.e. the optical axis of the camera 2 forms a positive angle of 30 degrees relative to a horizontal plane parallel to the ground and does not go higher towards the zenith).

The camera 2 is mounted to the aircraft A so that the optical axis of the camera 2 can be oriented towards the ground or towards the sky, without being hindered by the wall to which the device is mounted, or more generally being hindered by the body of the aircraft A. The camera is for example mounted on the front edge of the lower wall P of the aircraft A, as represented in FIG. 1, or on the side edge of this wall P.

In fact, as the camera 2 is secured to the casing 10, it is the location device 1 as a whole that is rotatably movable relative to the wall of the aircraft and able to adopt such an elevation.

The camera 2 comprises a lens provided with a reticle. The reticle passes through the optical axis O of the camera 2.

The camera 2 has an instantaneous field of view (IFOV) less than or equal to 0.1 milliradians. The field IFOV is the field of view associated with a pixel of an image acquired by the camera 2. Such a camera 2 is adapted to the location of targets at very great distance.

Furthermore, the camera 2 is sensitive to wavelengths in the visible and/or infrared range, for example infrared lengths in the SWIR (Short-Wavelength infrared) band ranging from 1 to 2 micrometers.

The camera 2 is for example configurable in several acquisition modes, each acquisition mode making the camera 2 sensitive to wavelengths specific to this acquisition mode. The camera 2 is for example configurable not only in an infrared acquisition mode, in which it is made sensitive to said wavelengths in the infrared range, but also configurable in other acquisition modes (visible, UV, etc.).

Moreover, the inertial unit 4 is a device known per se comprising a plurality of inertial sensors, typically accelerometers and rate gyros.

The inertial unit 4 is configured to calculate position and orientation data of the camera 2.

The stellar correction module 6 is known from the state of the art, for example from document EP 3 073 223 A1.

The location module 8 is configured to estimate a position of the target T, also known from the state of the art.

The location module 8 comprises a rangefinder. The rangefinder is configured to estimate the distance between the camera 2 and a target T seen by the camera 2.

The rangefinder may be an active rangefinder, for example a laser, known per se.

Alternatively, the rangefinder is of the passive type. It calculates the distance between the camera 2 and the target T based on a numerical model of the site in which the target T is situated.

The device further comprises an uncertainty estimation module 14 configured to estimate an uncertainty on an error likely to affect the accuracy of a target position T estimated by the location module 8.

The correction, location and estimation modules may be separate physical devices, a same physical device, be different computer programs executed by one or more processor(s) of the device, or be different parts of a same computer program executed by one or more processor(s) of the device.

The device further comprises a motor 16 for rotating the device relative to the carrier. The device, and in particular the motor 16, is supplied with electrical energy by the carrier.

The device further comprises an interface of communication with an operator station.

In the case of an aircraft A other than a drone, the operator station may be a station of the aircraft A: the communication interface is for example a wired communication interface or a wireless radio communication interface.

The operator station can be alternately in a ground station or in a carrier other than the one having the device on board. In this case, the communication interface is a wireless radio communication interface.

The device typically forms a gyro-stabilized ball (BGS) operating autonomously with respect to the aircraft A, except its energy supply by the aircraft A.

In other embodiments, the modules 6, 8, 14 may be offset within the aircraft.

Target Location Method without Stellar Correction

It is assumed that the aircraft A is in flight. A target T is situated on the ground.

With reference to FIG. 4, the camera 2 is oriented towards the target T, according to a first orientation (step 100).

To locate the target T, the following steps are implemented by the device.

The inertial unit 4 calculates position and/or orientation data of the camera 2 (step 102).

The camera acquires at least one image of the target T (step 104).

The (laser-active or passive) rangefinder estimates the distance between the target T seen by the camera 2 and the camera 2.

The location module 8 estimates a position of the target T by combining the distance, estimated by the rangefinder, with the orientation and position data of the camera 2 and with the acquired image (step 118).

Optionally, is also taken into account in the estimation implemented by the location module 8, an angular deviation between the optical axis of the camera 2 and an axis passing through a point of the camera 2 and a point of the target T. This angular deviation is calculated as a function of a deviation in pixels, in an image acquired by the camera 2 in the first orientation during step 104, between the reticle of the camera 2 passing through the optical axis and a pixel of the target T. This deviation is zero when the reticle is superimposed on the target T in the acquired image. It can for example be considered to orient the camera 2 so as to obtain such a superposition, which makes it possible not to take into account this deviation in the estimation implemented by the location module 8.

The location module 8 can thus use a formula of the following type for such estimation:

$$P_{target} = f_1(E) + f_2(\theta) + f_3(D)$$

where $P_{target}$ is the position of the target T estimated by the location module 8, this position being expressed in a coordinate system related to the Earth, E is a navigation state estimated by the inertial unit 4 comprising at least one position data $P_{BGS}$ and at least one data Orientation $\text{Orientation}_{BGS}$ of the camera 2 provided by the inertial unit 4, these data being for example expressed in a geographical coordinate system centered on the device and comprises an axis pointing towards the north of the Earth, an axis pointing towards the east, and a third axis, the three axes forming an orthonormal coordinate system, $\theta$ is an angular deviation between the optical axis of the camera 2 and an axis passing through a point of the camera 2 and a target point T. This angular deviation is a function of a deviation in pixels, in an image acquired by the camera 2 in the first orientation, between the reticle of the camera 2 and a pixel of the target T (optional as indicated above), D is the distance measured by the rangefinder, the functions $f_i$ are predetermined functions.

Target Location Method with Stellar Correction

As indicated in the introduction, the data produced by the inertial unit 4 during the step 102 may be tainted with errors, in particular drift errors.

Figure 3:
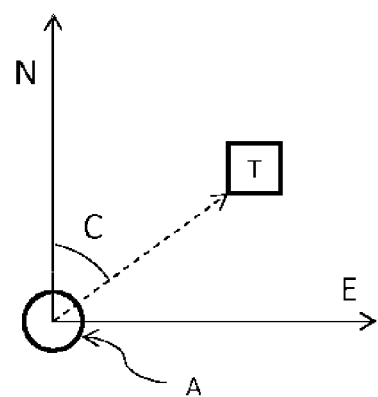
FIG. 3 is a view, in a horizontal plane relative to the ground, of the carrier and the target already represented in FIG. 1.

An error that is particularly detrimental to the location accuracy offered by the device is an error tainting a heading of the camera 2 calculated by the inertial unit 4. With reference to FIG. 3, the heading is an angle C formed between:

The axis O of the camera 2 projected in a horizontal plane parallel to the ground (the plane of FIG. 3, which shows the aircraft and the target viewed from above) and an axis N pointing towards the north comprised in this horizontal plane (knowing that the axis E represented in FIG. 3 is an axis pointing towards the east).

Thus, when the target T is situated at a great distance from the aircraft A, even a very small heading error has a very large influence on the final location error made by the device.

While the camera 2 adopts the first orientation (towards the target T), the estimation module estimates an uncertainty on a heading error made by the inertial unit 4 (step 106). The estimation module may be the inertial unit 4 per se: the inertial unit 4 then directly provides, in addition to position and orientation data of the camera 2, an uncertainty data on a heading error.

When the uncertainty on the heading error exceeds a predetermined threshold, the estimation module controls a displacement of the camera 2 towards a second orientation adapted so that a predetermined star S is within sight of the camera 2 (step 108).

Preferably, the first threshold is less than or equal to 0.3 milliradians, for example 0.1 milliradians.

The second orientation is determined by the estimation module as a function of the orientation data provided by the inertial unit 4, and the positioning information of the star S which are predetermined.

In the second orientation, the camera 2 acquires at least one image showing the star S (step 110).

Because of the errors that taint the orientation data of the inertial unit 4, there is a certain deviation in pixels, in the image acquired by the camera 2 in the second orientation, between a pixel showing the reticle of the camera 2 and a pixel showing the star S. This deviation is therefore representative of the positioning and orientation errors of the inertial unit 4.

The correction module 6 implements a stellar correction known from the state of the art based on the position and/or orientation data of the camera 2, so as to produce corrected position and/or orientation data (step 114).

The location module 8 uses the corrected data instead of the error-tainted data provided by the inertial unit 4, to estimate the position of the target T during the step 118 mentioned above.

Preferably, the camera 2 is configured in its infrared acquisition mode to acquire the images showing the star S. This infrared acquisition mode is the one that allows obtaining the most sensitive images of the star S and therefore improving the capacity of correcting the stellar correction, in particular by reducing the time period during which the target T is not observed.

While the camera 2 is situated in the second orientation, the image acquisition steps 110 and 114 are repeated for a star, and may further be implemented for at least one other star, after reorientation of the camera towards this other star during step 108.

The uncertainty estimation step 106 is also repeated over time, for example at regular intervals, even while the camera is oriented towards a star.

When the estimation module 14 detects that the heading error falls below a second predetermined threshold, the estimation module controls a displacement of the camera 2 towards the first orientation (that it will have previously memorized at the time of leaving it) (step 116).

The second threshold is less than or equal to the first threshold.

If the camera 2 was configured in an acquisition mode different from the infrared acquisition mode when the crossing of the first threshold has been detected, the camera 2 is reconfigured in this original acquisition mode to observe the target T.

Other criteria for switching from one orientation of the camera 2 to the other may be used.

The camera 2 can for example be configured to switch from one of the first and second orientations to the other orientation (steps 108, 116) in response to the reception, by the communication interface, of a command issued by the operator station. For example, it may indeed be urgent to reorient the camera 2 towards the target T in order to observe it while the uncertainty has not fallen below the second threshold, despite the fact that the conditions are not yet optimal to calculate an accurate position of this target T.

In the particular case where the communication interface receives a reorientation command from the first orientation to the second orientation, the camera can execute this command in a deferred manner. In some situations, the camera would not be able to see the star if it was immediately reoriented into the second position, for example when the aircraft is on the back or when the sky is not in the area of possible orientations of the camera. Consequently, not only the target would no longer be within sight of the camera, but the stellar correction could also not operate properly.

Therefore, the camera is advantageously configured to wait, after the reception of the command, for the mobile carrier to have an orientation relative to the star allowing the camera to see the star in the second orientation, before switching from the first to the second orientation. The camera may, for example, comprise means for detecting the orientation of the aircraft relative to the ground or the sky, or receive, via its communication interface, information enabling it to take knowledge of this orientation in order to manage this waiting, from the information available at the level of the mobile carrier.

On the other hand, an uncertainty other than the uncertainty on the heading error can be used as criteria for triggering a switching from one orientation to the other.

For example, it may be provided to use for this purpose an uncertainty on the position of the target T, this uncertainty being calculated by the location module 8 in addition to the estimation of position of the target T per se. In this case, the first threshold is preferably selected less than or equal to 10 meters.

Such a position error uncertainty, being in the form of covariance $COV_{POS\_target}$, is typically calculated as follows by the estimation module 14:

$$Cov_{POS_{target}} = F1.Cov_{INS}.F1^T + F2.Cov_{err\_cam}.F2^T + F3.Cov_{err\_rangefind}.F3^T$$

$$F1 = \frac{df_1}{dE}$$

$$F2 = \frac{df_2}{d\Theta}$$

$$F3 = \frac{df_3}{dD}$$

With:
$Cov_{INS}$: covariance of the navigation state E estimated by the inertial unit (this state comprising the position and orientation data estimated during step 102)

$Cov_{err\_cam}$: covariance of the noises of measurements of designation of the point of interest in the coordinate system of the camera 2, $COV_{err\_rangefind}$: covariance of the noises of measurements of designation of the distance D between the camera 2 and the target (the laser rangefinder in general).

This equation is a simple sum, because the errors are independent.

The location device 1 is advantageously implemented in a carrier of the type aircraft A, this type of carrier generally having for mission to locate targets at very great distance, in particular a drone. However, this device can be on board other types of carriers: land vehicle, ship, etc.

The invention claimed is:

1. A device for locating a target from a mobile carrier, the device comprising:
   a camera orientable relative to the carrier in:
      a first orientation towards the target wherein the camera can acquire an image of the target, and
      a second orientation towards at least one predetermined star wherein the camera can acquire at least one image of the star,
   an inertial unit configured to calculate position and orientation data of the camera,
   a stellar correction module configured to apply a stellar correction to the data calculated by the inertial unit based on the image of the star, so as to produce corrected position and orientation data,
   a location module configured to estimate a position of the target from the image of the target and the corrected position and orientation data,
   an uncertainty estimation module configured to estimate an uncertainty on an error affecting an accuracy of the position estimated by the location module, and
   an interface of communication with an operator station, wherein the camera is further configured to switch from one of the first and second orientations to the other orientation in response to the reception, by the communication interface, of a command issued by the operator station,
   wherein the camera is further configured to switch from one of the first and second orientations to the other orientation when the uncertainty crosses a predetermined threshold.

2. The device according to claim 1, wherein the camera is configured to wait, after the reception of the command, for the mobile carrier to have an orientation relative to the star allowing the camera to see the star in the second orientation, before switching from the first orientation to the second orientation.

3. The device according to claim 1, wherein the camera is configured to switch from the first orientation to the second orientation when the uncertainty crosses a first predetermined threshold, and wherein the camera is configured to switch from the second orientation to the first orientation when the uncertainty crosses a second predetermined threshold different from the first predetermined threshold.

4. The device according to claim 1, wherein the uncertainty is an uncertainty on a position error tainting the position of the target estimated by the location module.

5. The device according to claim 1, wherein the uncertainty is an uncertainty on a heading error of the camera tainting a heading data calculated by the inertial unit.

6. The device according to claim 5, wherein the first predetermined threshold is less than or equal to 0.3 milliradians.

7. The device according to claim 1, wherein the camera is configured to switch from the first orientation to the second orientation when the uncertainty crosses a first predetermined threshold, and wherein the camera is configured to switch from the second orientation to the first orientation when the uncertainty crosses a second predetermined threshold less than or equal to the first predetermined threshold.

8. The device according to claim 1, wherein the camera is configured to acquire the image of the predetermined star in an infrared acquisition mode in which the camera is sensitive to infrared wavelengths.

9. An aircraft comprising a device for locating a target according to claim 1.

10. A method for locating a target, comprising:
orienting a mobile camera on board a mobile carrier in a first orientation in which the target is within sight of the camera,
calculating, by an inertial unit, position and orientation data of the camera,
acquiring, by the camera, at least one image of the target,
orienting the camera in a second orientation relative to the carrier in which a predetermined star is within sight of the camera,
acquiring at least one image of the star by the camera,
applying a stellar correction to the data calculated by the inertial unit based on the image of the star, so as to produce corrected position and orientation data,
estimating a position of the target from the image of the target and the corrected position and orientation data,
estimating an uncertainty on an error affecting an accuracy of the estimated position,
wherein the camera switches from one of the first and second orientations to the other in response to the reception of a command issued from an operator station, and wherein the camera is further configured to switch from one of the first and second orientation to the other orientation when the uncertainty crosses a predetermined threshold.

11. The method according to claim 10, wherein the camera waits, after the reception of the command, for the mobile carrier to have an orientation relative to the star allowing the camera to see the star in the second orientation, before switching from the first to the second orientation.

12. The method according to claim 11, wherein the carrier is an aircraft.

13. An aircraft according to claim 9, wherein the aircraft is a drone.

14. The method according to claim 12, wherein the aircraft is a drone.

15. A device for locating a target from a mobile carrier, the device comprising:
a camera orientable relative to the carrier in:
a first orientation towards the target wherein the camera can acquire an image of the target, and
a second orientation towards at least one predetermined star wherein the camera can acquire at least one image of the star,
an inertial unit configured to calculate position and orientation data of the camera,
a stellar correction module configured to apply a stellar correction to the data calculated by the inertial unit based on the image of the star, so as to produce corrected position and orientation data,
a location module configured to estimate a position of the target from the image of the target and the corrected position and orientation data
an uncertainty estimation module configured to estimate an uncertainty on an error affecting an accuracy of the position estimated by the location module, and
wherein the camera is further configured to switch from the first orientation to the second orientation when the uncertainty crosses a predetermined threshold.

16. A method comprising:
orienting a mobile camera on board a mobile carrier in a first orientation in which a target is within sight of the camera,
acquiring, by the camera, at least one image of the target,
orienting the camera in a second orientation relative to the carrier in which a predetermined star is within sight of the camera,
acquiring at least one image of the star by the camera,
applying a stellar correction to data calculated by an inertial unit based on the image of the star, so as to produce corrected position and orientation data,
estimating a position of the target from the image of the target and the corrected position and orientation data,
estimating an uncertainty on an error affecting an accuracy of the estimated position,
wherein the camera switches from the first orientation to the second orientation when the uncertainty crosses a predetermined threshold.

* * * * *